(12) United States Patent
Hoffman et al.

(10) Patent No.: US 10,346,487 B2
(45) Date of Patent: Jul. 9, 2019

(54) DATA SOURCE ATTRIBUTION SYSTEM

(71) Applicant: LIVERAMP, INC., San Francisco, CA (US)

(72) Inventors: Auren Hoffman, San Francisco, CA (US); Manish Shah, San Francisco, CA (US); Jeremy Lizt, San Francisco, CA (US); Vivek Sodera, San Francisco, CA (US)

(73) Assignee: LIVERAMP, INC., San Francisco, CA (US)

( * ) Notice: Subject to any disclaimer, the term of this patent is extended or adjusted under 35 U.S.C. 154(b) by 659 days.

(21) Appl. No.: 14/712,802

(22) Filed: May 14, 2015

(65) Prior Publication Data

US 2015/0248493 A1    Sep. 3, 2015

Related U.S. Application Data

(62) Division of application No. 12/554,306, filed on Sep. 4, 2009, now Pat. No. 9,064,021.

(60) Provisional application No. 61/102,201, filed on Oct. 2, 2008.

(51) Int. Cl.

| | | |
|---|---|---|
| G06F 16/22 | (2019.01) | |
| G06F 16/955 | (2019.01) | |
| G06F 16/2457 | (2019.01) | |
| G06F 16/9535 | (2019.01) | |
| H04L 29/08 | (2006.01) | |
| G06Q 50/00 | (2012.01) | |

(52) U.S. Cl.
CPC .......... *G06F 16/9535* (2019.01); *G06F 16/22* (2019.01); *G06F 16/24575* (2019.01); *G06F 16/24578* (2019.01); *G06F 16/955* (2019.01); *H04L 67/306* (2013.01); *G06Q 50/01* (2013.01)

(58) Field of Classification Search
USPC ....................................................... 707/702
See application file for complete search history.

(56) References Cited

U.S. PATENT DOCUMENTS

| | | |
|---|---|---|
| 5,274,547 A | 12/1993 | Zoffel |
| 5,944,787 A | 8/1999 | Zoken |
| 6,327,574 B1 | 12/2001 | Kramer |
| 7,213,032 B2 | 5/2007 | Mascarenhas |
| 7,249,034 B2 | 7/2007 | Schirmer |

(Continued)

FOREIGN PATENT DOCUMENTS

| | | |
|---|---|---|
| JP | 2008-134769 | 6/2008 |
| KR | 10-2012-0053296 | 5/2012 |
| WO | 2015/038948 | 3/2015 |

OTHER PUBLICATIONS

Janez Brank et al., Predictive Algorithms for Browser Support of Habitual User Activities on the Web, 2005, IEEE, 7 pages.

(Continued)

*Primary Examiner* — Cheyne D Ly (57) ABSTRACT

A data attribution system uses a unique identifier (UID) that uniquely identifies a particular individual. A search is conducted of different data sources and, different types of profile information associated with the UID is extracted from the data sources. The different types of profile information associated with the same UID is aggregated together and displayed in a same screen presentation on a user interface.

8 Claims, 6 Drawing Sheets

(56) References Cited

U.S. PATENT DOCUMENTS

| | | | |
|---|---|---|---|
| 7,818,396 B2* | 10/2010 | Dolin | G06Q 30/02 707/709 |
| 7,853,614 B2 | 12/2010 | Hoffman | |
| 8,010,460 B2 | 8/2011 | Work et al. | |
| 8,131,745 B1 | 3/2012 | Hoffman | |
| 8,468,271 B1 | 6/2013 | Panwar | |
| 8,620,942 B1 | 12/2013 | Hoffman | |
| 2002/0026581 A1 | 2/2002 | Matsuyama | |
| 2002/0065891 A1 | 5/2002 | Malik | |
| 2002/0156895 A1 | 10/2002 | Brown | |
| 2003/0237093 A1 | 12/2003 | Marsh | |
| 2004/0139330 A1 | 7/2004 | Baar | |
| 2005/0159970 A1 | 7/2005 | Buyukkokten et al. | |
| 2005/0246391 A1* | 11/2005 | Gross | G06F 17/3089 |
| 2005/0267973 A1 | 12/2005 | Carlson et al. | |
| 2006/0080180 A1* | 4/2006 | Ens | G06Q 10/10 705/14.23 |
| 2006/0123080 A1* | 6/2006 | Baudino | H04L 67/306 709/204 |
| 2006/0179113 A1 | 8/2006 | Buckingham | |
| 2006/0224675 A1 | 10/2006 | Fox | |
| 2007/0008066 A1 | 1/2007 | Fukuda | |
| 2007/0027930 A1 | 2/2007 | Alvarado et al. | |
| 2007/0073888 A1 | 3/2007 | Madhok | |
| 2007/0143407 A1 | 6/2007 | Avritch et al. | |
| 2007/0143469 A1 | 6/2007 | Adams et al. | |
| 2007/0239680 A1* | 10/2007 | Oztekin | G06F 17/30867 |
| 2008/0097949 A1* | 4/2008 | Kelly | H04N 21/44204 706/52 |
| 2008/0104495 A1 | 5/2008 | Craig | |
| 2008/0162157 A1 | 7/2008 | Daniluk | |
| 2008/0184366 A1 | 7/2008 | Alperovitch et al. | |
| 2008/0235772 A1 | 9/2008 | Janzen | |
| 2008/0285464 A1 | 11/2008 | Katzir | |
| 2008/0288658 A1 | 11/2008 | Banga et al. | |
| 2009/0168995 A1 | 7/2009 | Banga et al. | |
| 2009/0276233 A1 | 11/2009 | Brimhall | |
| 2010/0042616 A1* | 2/2010 | Rinearson | G06T 17/30525 705/12 |
| 2010/0076987 A1 | 3/2010 | Schreiner | |
| 2010/0088313 A1 | 4/2010 | Hoffman | |
| 2010/0225607 A1 | 9/2010 | Kim | |
| 2011/0004504 A1 | 1/2011 | Ives et al. | |
| 2011/0184828 A1 | 7/2011 | Siegel | |
| 2011/0287741 A1 | 11/2011 | Prabhu | |
| 2012/0044156 A1 | 2/2012 | Michaelis | |
| 2012/0268248 A1 | 10/2012 | Hiraide | |
| 2013/0006766 A1 | 1/2013 | Dedeoglu | |
| 2013/0158984 A1* | 6/2013 | Myslinski | G06F 17/28 704/9 |
| 2014/0344954 A1 | 11/2014 | Kim | |

OTHER PUBLICATIONS

Gauch et al., Susan, ProFusion: Intelligent Fusion from Multiple, Distributed Search Engines1, Oct. 1996, Google Scholar, 637-649.
International Search Report dated Dec. 22, 2014 for PCT/US2014/055475; 2 pages.
Stolowitz Ford Cowger LLP, Listing of Related Cases, Jul. 14, 2015.
U.S. Appl. No. 11/945,208, filed Nov. 26, 2007, Hierarchical, Traceable, and Association Reputation Assessment of Email Domains, U.S. Pat. No. 7,853,614.
U.S. Appl. No. 12/099,748, filed Apr. 8, 2008, Associating User Identities With Different Unique Identifiers, U.S. Pat. No. 8,131,745.
U.S. Appl. No. 12/554,306, filed Apr. 8, 2010, Data Source Attribution System, U.S. Pat. No. 9,064,021.
U.S. Appl. No. 13/359,228, filed Jan. 26, 2012, Associating User Identities With Different Unique Identifiers, U.S. Pat. No. 8,620,942.
U.S. Appl. No. 13/838,151, filed Mar. 15, 2013, Anonymous Information Management, 2014-0278972.

* cited by examiner

FIG. 1.

Data Source Attribution (DSA) System

FIG. 2

Screenshot of the user interface providing data source
attribution highlighting and text display

DATA SOURCE ATTRIBUTION SYSTEM

This application is a division of U.S. patent application Ser. No. 12/554,306 filed Sep. 4, 2009, which claims priority to U.S. Provisional Application Ser. No. 61/102,201 filed Oct. 2, 2008, the disclosures of which are incorporated herein by reference in their entirety.

TECHNICAL FIELD

The present disclosure relates generally to searching for user profile information corresponding to a unique identifier. The information is collected from various sources, aggregated together into a profile, and displayed to the owner of the unique identifier. The owner may validate the correctness of the information and make appropriate changes to the information itself or the privacy of the information with the understanding of the source of the information.

BACKGROUND

Information is compiled on people at an astronomical rate. This compiled information includes: government, security, and criminal related data; demographic information; financial and credit history; purchasing and buying behavior; psychographics and interests; friend, family, colleague, coworker, and other social network association data; internet usage, clickstream, and online behavioral data; genome and medical/health information; third party activity, and other confidential, non-confidential, private, and public information collected by various entities. Collectors of this information include individuals, private companies, public companies, nonprofits, government and military branches, investigative/criminal/intelligence agencies, and more.

Data companies primarily collect data on people for profit purposes. This includes criminal histories, driver's license data, vehicle registration records, credit histories, marriage and divorce records, Social Security Numbers (SSN), dates of birth, clickstreams, actions of individuals, names and addresses of family members, neighbors and business associates, and significant amounts of other data. Known data warehouse and email append companies may even carry hundreds of data elements on a particular individual, including household income, marital status, number of children, subscriptions to particular publications, vehicle preferences, etc.

These entities may often collect information on consumers with neither the consumers' consent nor knowledge. Consumers have no way of checking the source, accuracy, and privacy of the data. This may limit and penalize the individual's reputation. This may also restrict delivery of certain products or services, promote delivery of irrelevant information and spam, and limit other benefits that consumers may enjoy. Many entities that collect information on consumers will not disclose information collected on a consumer and do not offer partial or complete data opt-out from their databases. This creates an imbalance of control and power towards these entities with very little check and balance that may otherwise be provided by consumers.

Changes in the storage and retention of consumer data may come about by legislation and consumer focused policies demanding changes. At this time, legislation is currently being passed pertaining to the issue of consumer control of their information. The "Shine the Light" law (California Civil Code section 1798.83) imposes specific disclosure requirements on many businesses that share their consumers' personal information with other businesses for direct marketing purposes. This is a step in the direction for a more consumer-centric data control, but further initiatives and steps are necessary.

Credit Report Agencies (CRAs) collect financial and credit related information on consumers. In the past, CRAs collected and shared this information with financial institutions without the consumer's consent or knowledge. Consumers have demanded their information to be made available and as a result, consumers may now access not only their credit report and score, but also their credit history and which entity or institution queried their credit report.

A consumer's credit report is created with data about that particular consumer from many different sources. The source of credit is displayed on the credit report along with other financial information pertaining to the line of credit. In checking for inaccuracies and errors, the consumer may use this source information to get to the root of the inaccuracy or error. For instance, if an incorrect amount of credit is listed in the credit report, the consumer may contact the issuer of the credit or the source displayed on the credit report, provide proper information, and fix the incorrect amount or other inaccuracies.

Displaying the source of credit enables consumers to take control in correcting credit report information with CRAs, especially given the fact that many credit reports in general contain inaccuracies and errors. In the July 2000 issue of *Consumer Reports*, it was cited that more than 50% of the credit reports checked contained errors. To supplement this, a survey conducted by the U.S. Public Interest Research Group in 2004 found that one in four credit reports contained serious errors. Credit reports are used to make a number of critical decisions that go far beyond your ability to obtain credit cards and loans, including renting an apartment, seeking employment, and obtaining insurance. These individuals thereby suffer with a damaged reputation, credibility, and creditworthiness and cannot enjoy the same benefits as other individuals. Although state and federal laws provide individuals with the right to have errors corrected, some consumers who have had errors corrected find the incorrect information reappears at a later time.

Facebook's "Beacon" advertising medium allows advertisers to channel Facebook users to advertise their services or products. When a Facebook user makes a purchase for a product or service from a third party that happens to be a Facebook advertiser, Facebook displays on the user's Facebook profile (with permission), the product and the source of the product purchased. This semi-public information is visible to the Facebook user's network and anyone within the network may be able to see the source and the particular third party from which the user purchased the product or service. In this example, Facebook is leveraging source attribution as an advertising medium and therefore for profit purposes.

Other attribution systems are limited to organizational intranets. These systems relate to documents and affinities towards keywords or terms within a document to create profiles on individuals within the intranet. This information is not publicly available and is limited to a small niche of individuals within a workplace intranet for example. Also, the data sources are contained within the intranet, as opposed to coming from outside, third party sources.

BRIEF DESCRIPTION OF THE DRAWINGS

Embodiments are illustrated in the figures. However, the embodiments and figures are illustrative rather than limiting.

DETAILED DESCRIPTION

In the following description, several specific details are presented to provide a thorough understanding of embodiments. One skilled in the relevant art will recognize, however, that the embodiments can be practiced without one or more of the specific details, or in combination with other components, etc. In other instances, well-known implementations or operations are not shown or described in detail to avoid obscuring aspects of various embodiments of the invention.

All people should be entitled to certain fundamental rights with respect to their data on the internet. This includes the fact that individuals should have the right to own their information that is transmitted and stored online by data entities. And in ownership of this information, individuals should not only have access to what data is collected on them, but also access to where this information is stored and rooted. In creating such transparency, individuals will have more power and control and thereby present a more accurate representation of who they are, with respect to the data collected on them.

A data source attribution (DSA) system provides these capabilities. The DSA system uses a unique identifier (UID) that is granted for a human to use, verified by that human, and unique such that there is only one identifier in existence in the space of online, internet activity. Such UIDs may include: email addresses, website usernames or identification numbers, instant messenger or chat screen names, telephone numbers, and blog and website URLs.

The UID may be recognized as personally identifiable information (PII), which is information that can potentially be used to identify, contact, or locate a single human or small group of humans (i.e. a household). PII includes name, address, phone number, fax number, email address, financial profiles, medical profiles, social security number, and credit card information. An email address or phone number may not be explicitly PII, but when grouped together with a name or address can be recognized as PII. While PII may be used to identify, contact, or locate a single human, the purpose of a UID is to distinguish a human from another human. Note that images, photos, audio recordings, and video recordings might not be considered UIDs since they are not granted for use but rather self-developed, not verified, and can be duplicated; although, the images, photos, audio recordings, and video recordings may help in identifying UIDs.

Figure 1:
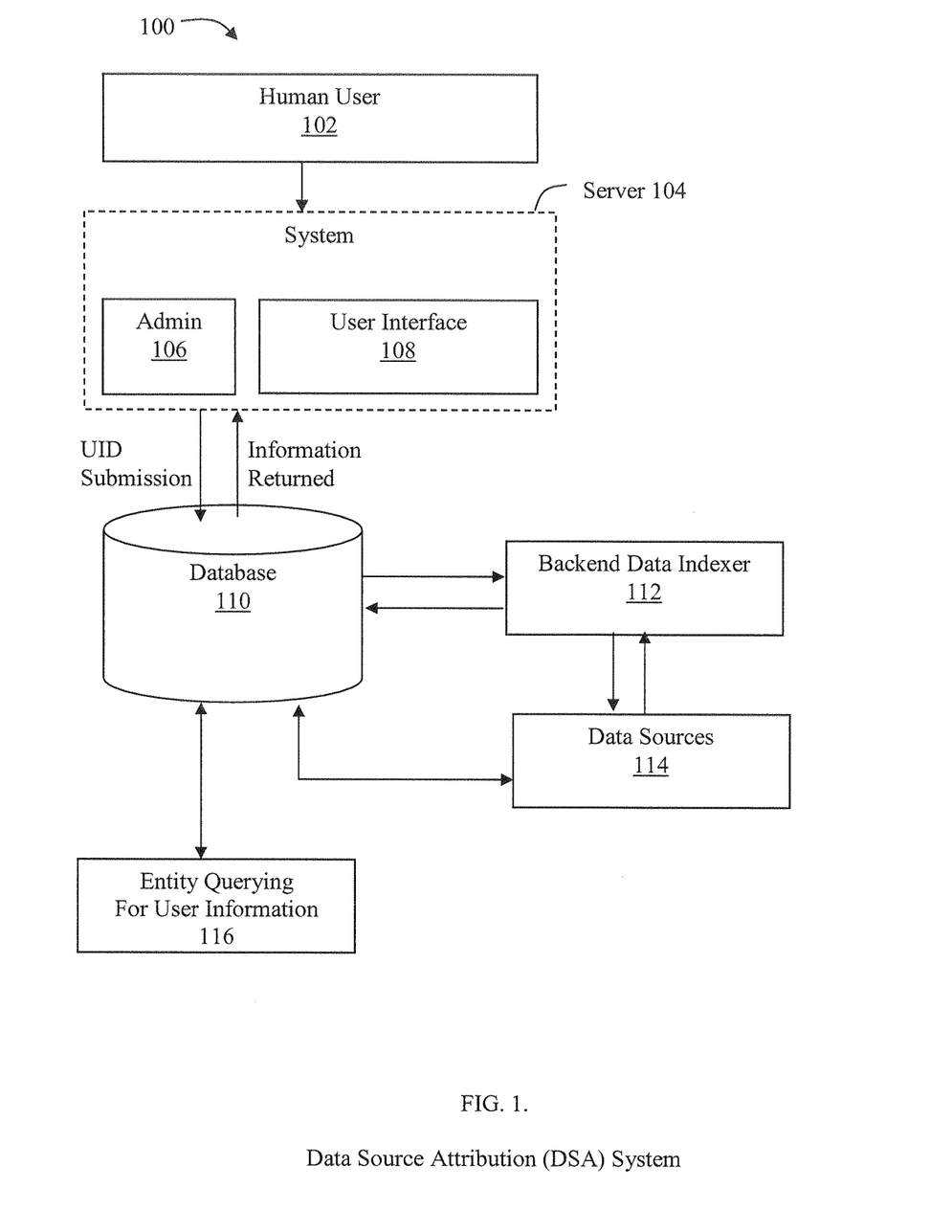
FIG. 1 shows a diagram of a data source attribution (DSA) system.

FIG. 1 depicts an example data source attribution (DSA) system 100 that retrieves information for a UID and displays the information and the source of the information. In the example of FIG. 1, the DSA system 100 includes a server 104 that receives requests from a human user 102. The server 104 operates an administration (admin) application 106 that submits a UID to a database 110 and retrieves back the profile information associated with the UID submission. A backend data indexer 112 is used to retrieve information from one or more third party data sources 114. A user interface 108 is used to then display the profile information from database 110 and third party data sources 114 to the user 102 via a webpage or other user interface.

In the example of FIG. 1, the admin 106 operating on server 104 is locally, remotely, or otherwise coupled to the UID database 110. In the example of FIG. 1, the UID database 110 catalogs data associated with UIDs. This data is again obtained from the third party data sources 114 or is obtained directly from the user 102 entering the information into the database 110 via the user interface 108. In the UID and information database 110, each record is categorized randomly or alphabetically. For example, the UID database may catalog all of the profile information according to associated email addresses. The cataloged profile information may include a human name, address, age, employment history, schools attended, etc. Other types of information and operations are described in more detail below.

A user 102 signs into the DSA system 100 and is then shown information on themselves based on their unique identifier (in one example, an email address). The DSA system 100 indexes the information obtained from the various data sources 114. The DSA system 100 aggregates information from these different data sources 114 and makes the aggregated information available to the user 102 through interface 108. The user 102 may see their own information displayed on a search results/profile webpage 160 shown in more detail in FIG. 2.

In one example, the third party data sources 114 may include different internet sites, such as Myspace, Friendster, Flixster, etc. The profile information extracted and displayed from these different data sources 114 may include demographic information, psychographic and interests information, friend/network information, and any other information fields that is all collected from publicly available online sources used by the user 102. Examples of publicly available online data sources 114 include online social networks and community sites, ecommerce sites, forums and message boards, among various other sources. This social web footprint and what websites are used by an individual are also displayed on the webpage 160 in FIG. 2.

In embodiments other than the example in FIG. 1, there may be a more complex relationship between elements of the DSA system. For example, the user interface may be operated by a third party or there may be multiple parties providing user interfaces, requiring additional security and validation measures between the user interface and the database.

Automatic Data Aggregation

In FIG. 1, information from different data sources 114 is collected by the backend data indexer 112 operated by server 104 and stored in the database 110. The indexer 112 may be a spider, crawler, script, or any other technical means that identifies and extracts particular information from specified data sources (e.g. websites). The spider or crawler can access particular public or private websites, with or without permission, and catalog specified profile information in the database 110. For example, the indexer 112 may access the Myspace website and obtain the profile information for a person associated with a particular email address.

The indexer 112 can also identify the date and time of the last activity for the user associated with the email address on the Myspace website. This last activity information can be obtained from the user profile information on the public website and then displayed on the webpage 160 displayed by the user interface 108 in the DSA system 100.

The indexer 112 may also determine how long the person associated with the UID (e.g., email address) has been a member of a particular website (e.g., data source). Again this information may be publically available from the user profile on the website. The indexer 112 extracts this length of membership information from the data source 114 which can then be displayed in the first known activity field on the webpage 160 shown in FIG. 2.

The first known activity information may also be used by the administration application 106 to prioritize the information displayed on webpage 160. For example, information extracted from a website where the person has been a member for over 5 years may be more reliable than information from a website where the person has only been a member for 2 weeks. On the other hand, the personal information from a website where the person has only been a member for two weeks may be more up to date, than other similar information extracted from another website where the person has been a member for over 5 years.

The admin 106 displays and links all of the information together that is extracted from the different data sources 114 and displays all of the related information to the user at the same time via the same webpage 160. Alternatively, the admin 106 may select and display what it believes to be the most reliable information from multiple different data sources 114 and then identify the particular data source 114 where the displayed information was obtained. Displaying the source of user information is described in more detail below.

The DSA system 100 can provide complete transparency to the user 102. This means all public and private information obtained by the DSA system 100 from data sources 114, and all additional information entered directly into database 110 by the user 102, can be made available and displayable to the user 102. As mentioned above, the administrator application 106 can also identify what data source 114 provided the user profile information and can also identify when the data was extracted from that identified data source 114.

The DSA system 100 can also track and identify to the user 102 what entities 116 have looked at the user profile information. For example, the administrator 106 tracks what internet addresses, corporations, individuals, and other entities request information for a particular UID and then displays information on the WebPages 160 identifying those different entities to the user 102.

User 102 may use knowledge of entity querying for user information 116 as a means to set privacy settings and verify accuracy of information at the data source. For example, user 102 may determine that information that was not intended to be publically-available is visible on the internet, and may take action accordingly to log into the data source and change privacy settings. As a benefit, the user 102 may receive more targeted communications and better services based on access to user information and accuracy of user information.

User Interface

The DSA system 100 provides simplified data source attribution on a particular profile by displaying the data source on the same webpage 160 or on the same series of webpages or screen pages in response to a given user action. In one example, this action includes, but is not limited to, the user using a computer hardware peripheral such as a mouse or equivalent, to guide a cursor over the particular data field that is displayed on webpage 160. By analyzing a clickstream and cursor position relative to the webpage 160, the user interface 108 can identify the data element (data field) in question and in the backend simultaneously determine the data source associated with the data element. In response, the user interface 108 displays the data source by highlighting the data source on the profile page 160. These data sources 114 may include a list of web memberships and websites (online communities) that the user belongs to that are displayed on the right side of webpage 160. The user interface 108 can also display the text "[data element] found via: [data source]," or any other variation of displaying information.

Figure 2:
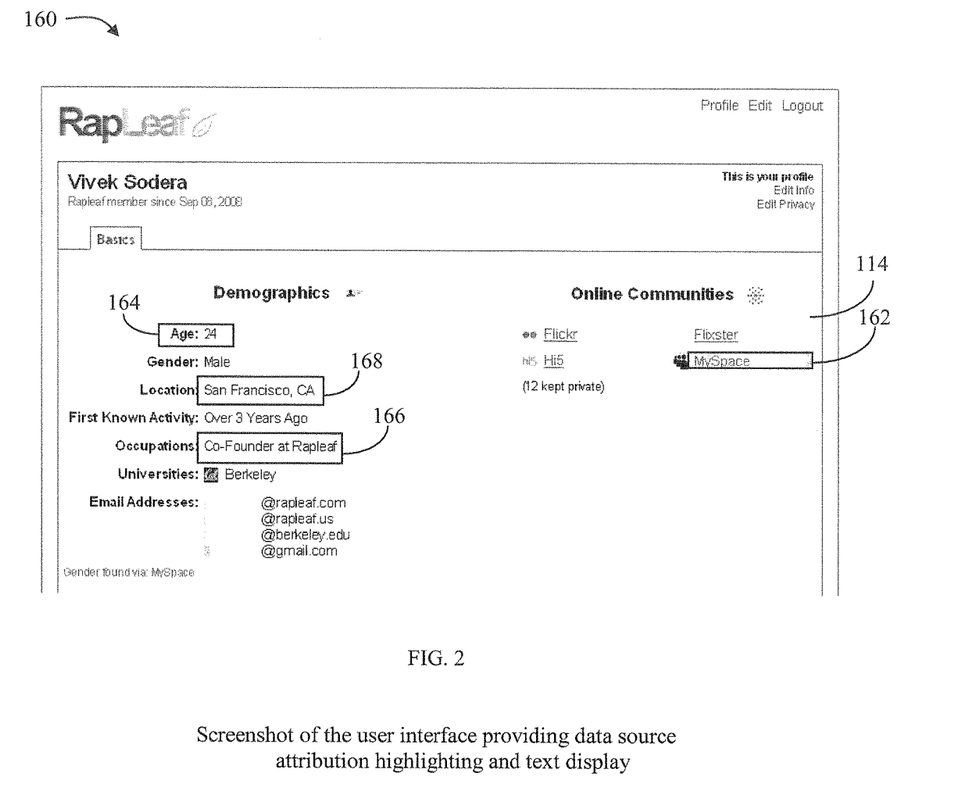
FIG. 2 shows a screenshot of an example webpage displaying data source attribution information provided by the DSA system in FIG. 1.

Referring to FIG. 2, the demographic, psychographic, and network information (profile information) is displayed on webpage 160 in a way that links and notifies the user of the data sources 114 that provided the information, such as publicly available online websites. For example, the left side of webpage 160 displays the Age, Gender, Location, Occupation, and attended universities for the user associated with the UID.

In this example, the right side of webpage 160 displays on-line websites 114 that were either accessed by the DSA system 100 to retrieve the profile information associated with a particular UID or websites that the DSA system 100 determined the user belonged to.

In this embodiment, when a user hovers a mouse cursor over particular data elements on the webpage 160, the data source 114 that supplied the related information can be highlighted as shown in FIG. 2, or displayed in a popup window, or otherwise displayed to the user. For example, the user may hover a mouse cursor over the Age field 164, on the left side of webpage 160. The user interface 108 may accordingly highlight the Myspace link 162 on the right side of webpage 160 indicating that the '24' year old age information displayed in the Age field was obtained from the Myspace website. In another example, when the mouse cursor is hovered over a data field, the user interface 108 displays a popup window that shows the data source 114 for the associated information contained in the data field.

As mentioned briefly above, in one embodiment, the profile information obtained from multiple different data sources 114 may be accumulated and displayed on the same series of web pages or screen pages. The user can then identify the different sources of the information by hovering the mouse cursor over the associated data field on webpage 160. However, there may be discrepancies between the information obtained from two or more different data sources 114. For example, the Myspace data source may indicate the user occupation in field 166 as "Co-founder of a company" and a second data source 114 may indicate the user occupation as Chef. The user interface 108 may display a notice on webpage 160 indicating a discrepancy in the Occupation information in field 166.

In another embodiment, when there is an information discrepancy between two data sources, the admin module 106 selects the information from the more reliable data source 114. For example, a first social networking website may indicate the age of the person associated with the UID as 25 and a second social networking website may indicate the age of the person associated with the UID as 45.

From past experience, it may be determined that the information obtained from the first social website is often more reliable than the information obtained from the second social website. For example, information obtained from a more business oriented website, may commonly be more reliable than the information obtained from a more leisure oriented social website. Accordingly, the admin 106 is programmed to give priority to displaying the information obtained from the first business oriented website over displaying the same type of information obtained from the second leisure oriented social website.

There may be information for certain fields on webpage 160 that are not available from the first more reliable website. In this case, the admin 106 may populate those other fields with information extracted from the less reliable second website. In other situations, the first website may have more reliable information for some types of data, such as employment related information. However, the second website may have more reliable information for other types of data, such as recreational activity information. In this situation, the admin 106 and user interface 108 may display the more reliable professional information from the first website for business related fields and display the more reliable leisure related information from the second website for leisure related fields. Again, the user 102 may determine the source of different displayed information by hovering the mouse cursor over the displayed information.

In another embodiment, the user interface 108 can move to a particular webpage 160 or location on the webpage 160 that displays only the profile information associated with a particular selected data source. For example, the user may select the Myspace link 162 on the right side of webpage 160. The user interface 108 then moves to a location on the webpage 160 or brings up another webpage 160 that displays only the information obtained from the Myspace website associated with the particular UID. The user can either scroll down on the webpage 160 or select another link on the right side of webpage 160 to display all of the profile information obtained from a different data source 114. Fields displayed on the web pages 160 may be left blank, if the associated information is not obtainable from the associated data source 114.

For some fields of data, the DSA system 100 may also allow the user to modify a data source 114 directly from the user interface 108. This may be possible due to a proprietary relationship with the data source 114 that enables the DSA system 100 to directly push information to the data source 114. Alternatively, this may be possible through a mechanism such as an automated login system where the user provides the DSA system 100 access to modify information within the data source 114. For example, if a user notices that a particular data source 114 indicates residence in Cambridge, U.K., and the correct residence is Cambridge, Mass., the user could modify the information within the data source 114 directly from the user interface 108.

Programmable Privacy

The DSA system 100 may also include measures and systems to prevent users from abusing data source attribution. By abuse, this includes individuals using the information to cause harm to others or gain unfair advantages or perks over others.

In one embodiment, an individual may restrict view of their social network and social web footprint for their own personal reasons. The admin 106 accordingly may not attribute demographic, psychographic, and network association information to a particular restricted data source. Essentially, controls are put in place by the user by selecting options presented by the user interface 108 that allow individuals to manage and control privacy of displayed information.

For example, the user associated with the UID may have the option of programming the user interface 108 (FIG. 1) to not display the names of particular selected data sources. In the example shown in FIG. 2, 12 different data sources 114 were kept private. If the user hovers the mouse cursor over a data fields containing information from one of these private sites, no source information is displayed on the webpage 160.

Further, a user may prevent particular pieces of information from ever being displayed on the webpage 160. For example, the user 102 may select a profile field that prevents the user interface 108 from displaying any information related to age. Accordingly, the user interface 108 will not display any age information regardless of which data source 114 or database 110 contained the age information.

User Access

A typical use case may include an individual using DSA 100 to ensure that their information that is publicly accessible is indeed accurate. The results may be inaccurate, for instance the location field 168 on the webpage 160 may indicate "San Francisco, Ill." and the individual may actually live in San Francisco, Calif. From webpage 160, the individual can see that this information was obtained from a particular online source and can then access the identified data source explicitly to change the incorrect information. This may require the user to manually edit the public profile the user created on that particular website or may require the user to work with a website administrator of that particular website.

The DSA system 100 enables individuals to lookup their publicly available online information from a single common website. This allows the user to more easily identify and change inaccurate information, and thus gives individuals more power to control their information online.

Figure 3:
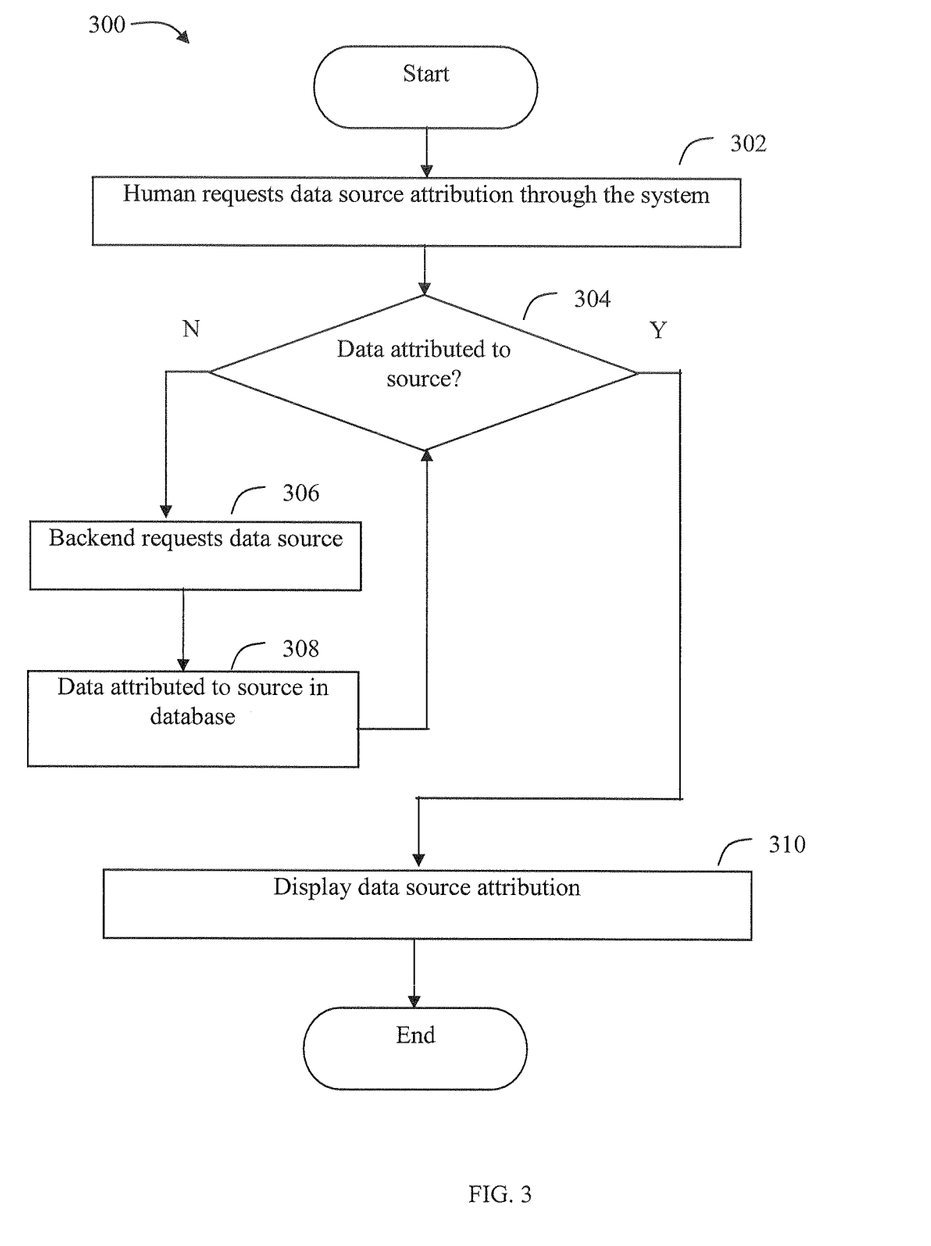
FIG. 3 is an example flowchart explaining how the DSA system in FIG. 1 obtains and displays the data source attribution information.

FIG. 3 is a flow chart 300 explaining the operations performed by the DSA system 100 in more detail. In operation 302, a user requests data source attribution through the DSA system 100. For example, the user 102 in FIG. 1 accesses a website over the internet serviced by the server 104 and database 110. The user may be required to enter a login ID and user password that allows the user to then access the attribution information in database 110. The user may enter their UID into a webpage presented by the user interface 108, or the DSA system 100 may automatically start searching for the information for a particular UID associated with the user's login ID. As mentioned above, one type of UID may be the user's email address.

In decision block 304 the DSA system 100 determines if there is already information in database 110 associated with the identified UID. If so, that information may be displayed to the user 102 via the user interface 108 in operation 310.

However, there may not be any information in database 110 associated with the UID, only a partial set of information for the UID, or some outdated information for the UID. In any of these situations, the DSA system 100 in operation 306 causes the indexer 112 to access different data sources 114 to obtain new profile information. Even if there is a complete set of profile information contained in database 100 for a selected UID, the DSA system 100 may still, either automatically, periodically, or pursuant to a user request 302, have the indexer 112 search the different data sources 114 for any new or updated profile information.

Data Sources

Figure 4:
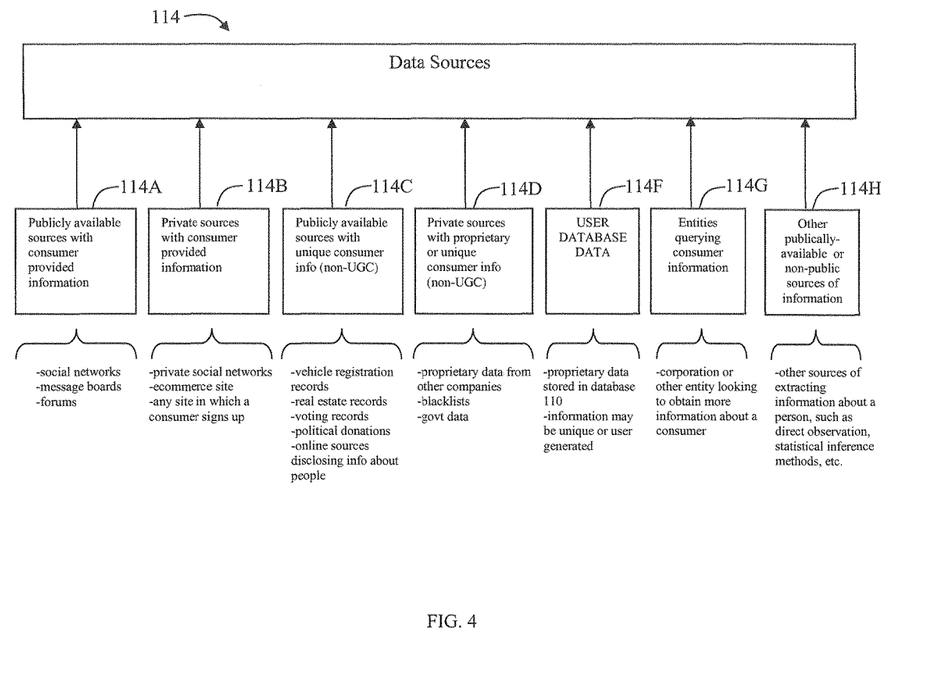
FIG. 4 shows a collection of data sources accessed by the DSA system shown in FIG. 1.

FIG. 4 shows some of the different data sources 114 that may be used or accessed by the DSA system 100 and stored in the database 110. The data sources 114 may include online sources, offline sources, and private sources. Online sources that may display publicly available information in the future, but do not currently exist, may be included as information sources. This also includes existing systems and sources that are private but may publicly display information in the future.

Publically available sources 114A may comprise information that is provided by the user. For example, social network, message boards, internet forums, etc. Private sources 114B may also include information provided by the user, such as private social networks, ecommerce websites, or any websites in which a consumer signs up. Publically available sources 114C may contain unique consumer information. For example, vehicle registration records, real estate records, driving records, voting records, political donations, health information, government related data, technographics, and any other on-line sources disclosing information about people.

Private sources 114D may contain propriety or unique consumer information such as proprietary data from other companies, blacklists, government data, etc. The database data 114E may include proprietary information entered directly into the database 110 by users. This may include new information that is not currently contained in the database 100 or may comprise edited information that was previously loaded into the database 110 from another data source.

As described above, the user interface 108 via the webpage 160 identifies which of these data sources 114 is the source of the displayed information. Thus, if the user 102 modifies the profile information previously obtained from say a social website, the user interface 108 will change the identified source of the information from say data source 114A to data source 114F.

As also mentioned above, the DSA 100 can also store and identify information 114F about entities 116 (FIG. 1) that query the DSA 100 for information associated with a particular UID. For example, a business 116 (FIG. 1) may access the profile information in database 100 to discover information associated with a particular email address for a job applicant. The DSA system 100 captures the internet address and any other information 114F that the company representative is required to enter into the DSA system 100 prior to accessing the UID information in database 110. The company information 114F may then be displayed on one of the WebPages 160 when the user 102 associated with that UID accesses the DSA system 100.

The DSA system 100 may also negotiate with different data sources to proactively and periodically push information to database 100 without the DSA 100 having to activate indexer 112. In another embodiment, the DSA 100 may automatically push update profile information to the different data sources 114. In this embodiment, the DSA system 100 sends database information added or corrected by the user to particular data sources 114 that then replace their outdated information with the corresponding information in database 110. A particular user may selectively enable this download feature either through the DSA system 100 and/or through the website receiving the updated information.

Thus, by displaying offline or private data, the DSA system 100 provides a way for individuals to obtain their information in an offline or private manner and address the owners of that information. Data displayed by the DSA system 100 may extend beyond demographic information, psychographic information, social web footprint, and network/association information. These other data types include offline, online, and private data that may be grouped and displayed in a particular manner deemed fit per the needs of the DSA system 100.

The data sources 114 mentioned above may include third party data sources. These data sources 114 in the future may be user generated and may thus be attributed to a user generated source or individuals in particular. If and when user generated information is included in the composite data sourcing, the DSA system 100 may display and attribute the information similarly or differently to the user generated data source than existing data source attribution.

The DSA 100 can also be programmed by the user to select which data sources 114 are used to accumulate profile information. For example, the user may type into a webpage particular websites that the indexer 112 then accesses to obtain profile information. In another embodiment, the user 102 can also identify data sources that the indexer 112 should not access when obtaining profile information. For example, the user 102 may type in a particular social website that then prevents the indexer 112 from accessing that particular website for profile information.

The user 102 or the DSA system 100 may also have a priority list that determines an order that data sources 114 are searched by the indexer 112 for profile information. The indexer 112 accordingly obtains information from the different data sources 114 for a particular UID according to the priority list.

Figure 5:
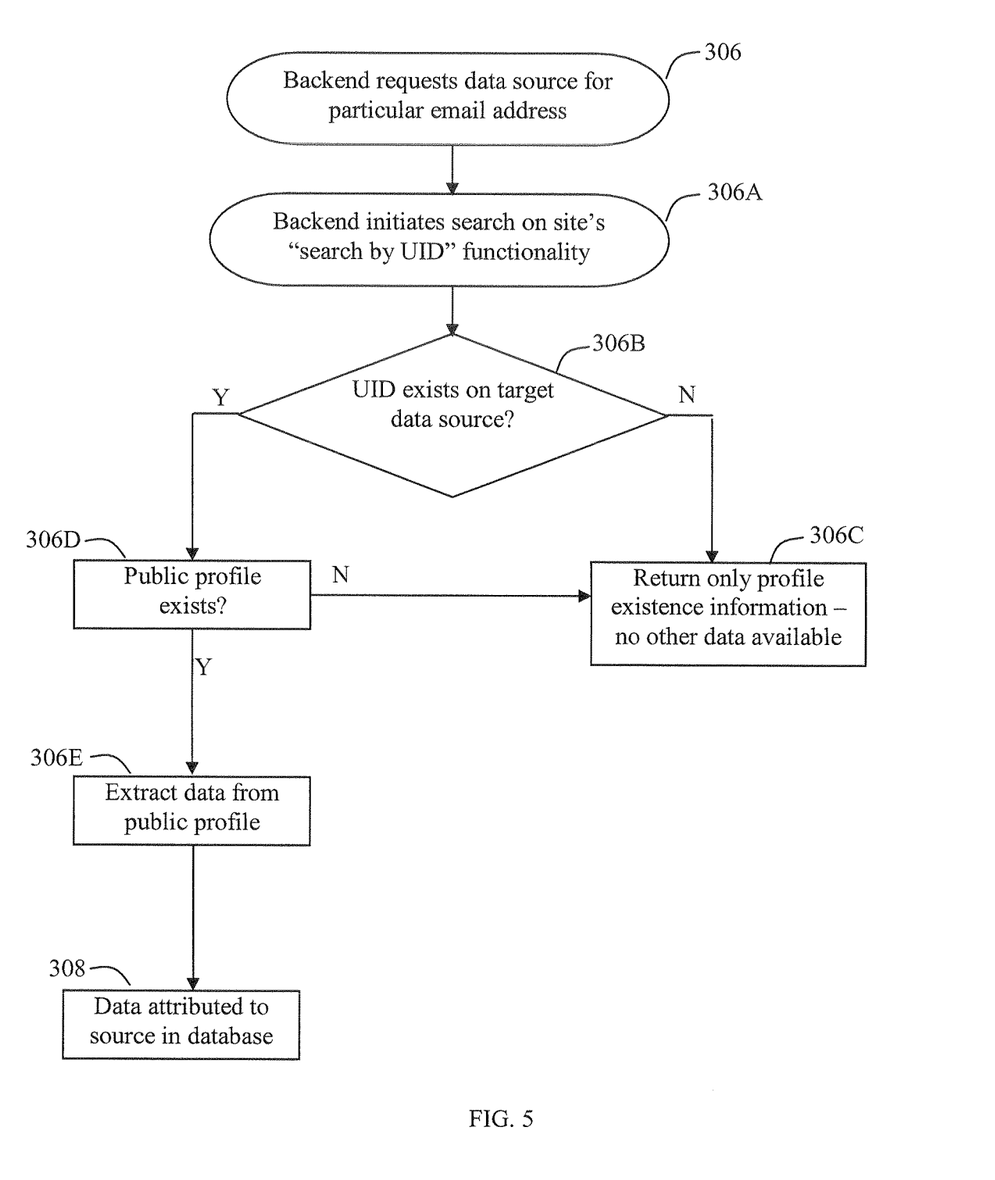
FIG. 5 is an example flowchart explaining how data may be attributed for a hypothetical data source in the DSA system shown by FIG. 1.

FIG. 5 shows one technique that the DSA system 100 might use to attribute data from a hypothetical data source 114. In operation 306, the back end administration 112 requests a data source for a particular email address. The data sources may be preprogrammed into the server 104 or may be automatically identified by the DSA system 100 by conducting periodic web searches using the UID.

In this example, the particular data source 114 has a "search by UID" functionality that allows the backend data indexer 112 to directly search a data source 114 by UID (such as an email address). In other cases, if there is no functionality that allows data sources to be directly searched by UID, the data indexer may need to use other methods to discern information, such as crawling the entire source or relevant portions of the source directly, matching by name and other non-UID attributes, requesting the UID directly from the data source owner, or other methods.

Once the data source 114 entry associated with the UID in question has been found in decision operation 306B, the data source may either provide no further information or link to a profile with further data, as shown in decision 306D. If there is no further data available at the source or if this particular source has no data on a given UID, operation 306C shows that the only information returned to the data indexer 112 is the existence of a profile in a particular data source.

Otherwise, if more information is available about the UID at this source, data is extracted from the source in operation 306E and is attributed to the source in the database in step 308. Depending on the data source, more complex matching or data extraction techniques may be needed to find and classify relevant information about a particular UID.

The indexer 112 may search the different data sources 114 prior to displaying information to the user 102, or may search the different data sources 114 while at the same time displaying to the user any other information already contained in the database 110. If there is little or no information currently in database 110 associated with the selected UID, the user interface 108 may display a notice directing the user 102 to check back in some specified amount of time to view any subsequently obtained information. The DSA system 100 then causes the indexer 112 to search the data sources 114 to accumulate and store into database 110.

Computer System

Figure 6:
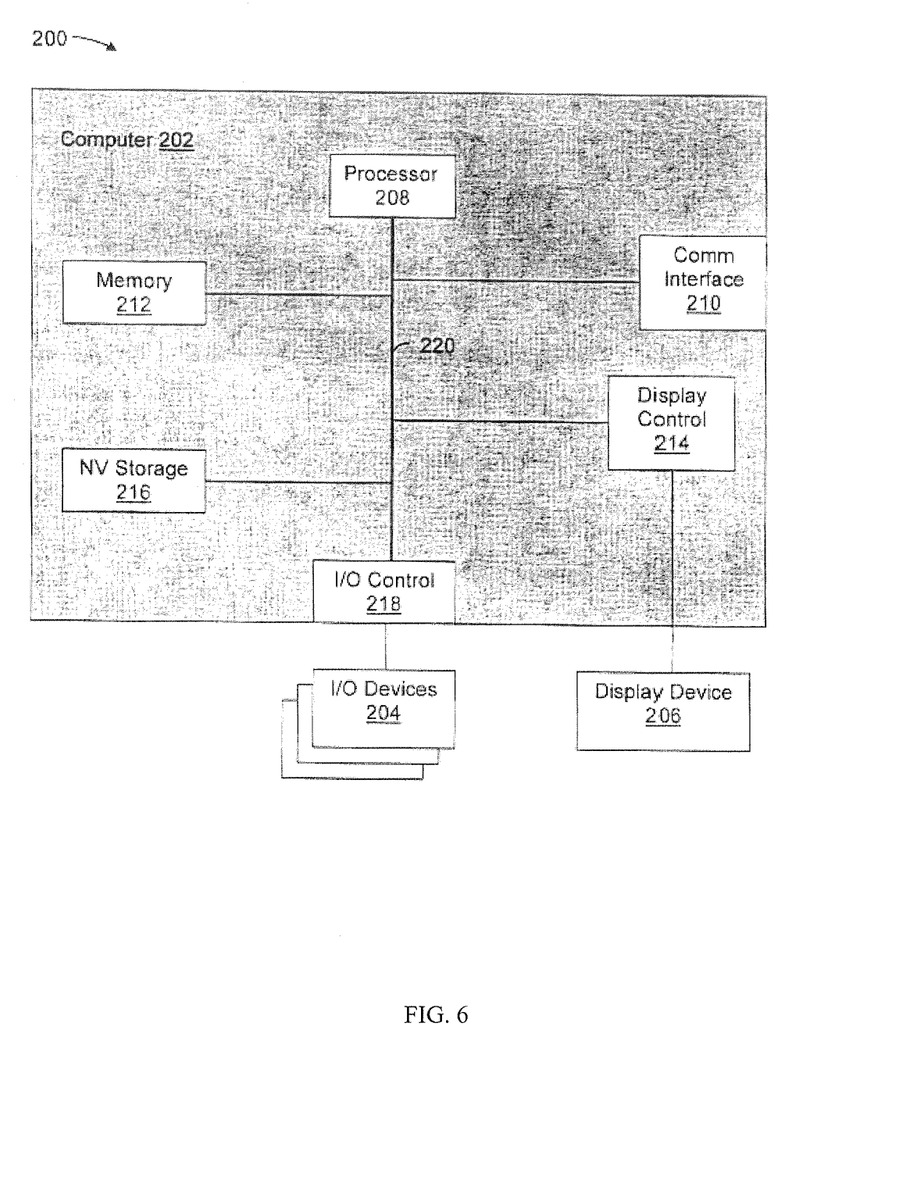
FIG. 6 shows an example computer system that operates the DSA system of FIG. 1.

FIG. 6 depicts a computer system 200 suitable for implementation of the server 104, admin 106, user interface 108, database 110, and/or the backend data indexer 112. The computer system 200 includes a computer 202, I/O devices 204, and a display device 206. The computer 202 includes a processor 208, a communications interface 210, memory 212, display controller 214, non-volatile storage 216, and I/O controller 218. The computer 202 may be coupled to or include the I/O devices 204 and display device 206.

The computer 202 interfaces to external systems through the communications interface 210, which may include a modem or network interface. The communications interface 210 can be considered to be part of the computer system 200 or a part of the computer 202. The communications interface 210 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 210 optional in the strictest sense of the word.

The processor 208 may include, by way of example but not limitation, a conventional microprocessor. While the processor 208 is a critical component of all conventional computers, any applicable known or convenient processor could be used for the purposes of implementing the techniques described herein. The memory 212 is coupled to the processor 208 by a bus 220. The memory 212, which may be referred to as "primary memory" can include Dynamic Random Access Memory (DRAM) and can also include Static RAM (SRAM). The bus 220 couples the processor 208 to the memory 212, and also to the non-volatile (NV) storage 216, to the display controller 214, and to the I/O controller 218.

The I/O devices 204 can include a keyboard, disk drives, printers, a scanner, and other input and output devices, including a mouse or other pointing device. For illustrative purposes, at least one of the I/O devices is assumed to be a block-based media device, such as a DVD player. The display controller 214 may control, in a known or convenient manner, a display on the display device 206, which can be, for example, a cathode ray tube (CRT) or liquid crystal display (LCD).

The display controller 214 and I/O controller 218 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 216, which may be referred to as "secondary memory," is often a magnetic hard disk, an optical disk, or another form of storage for large amounts of data. Some of this data is often written, by a direct memory access process, into memory 212 during execution of software in the computer 202. The non-volatile storage 216 may include a block-based media device. The terms "machine-readable medium" or "computer-readable medium" include any known or convenient storage device that is accessible by the processor 208 and also encompasses a carrier wave that encodes a data signal.

The computer system 200 is one example of many possible computer systems which have different architectures. For example, personal computers based on an Intel microprocessor often have multiple buses, one of which can be an I/O bus for the peripherals and one that directly connects the processor 208 and the memory 212 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 212 for execution by the processor 208. A Web TV system, which is known in the art, is also considered to be a computer system, but it may lack some of the features shown in FIG. 2, such as certain input or output devices. A typical computer system will usually include at least a processor, memory, and a bus coupling the memory to the processor.

The computer system 200 may be controlled by an operating system (OS). An OS is a software program used on most, but not all, computer systems that manage the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

CONCLUSION

The DSA system 100 pulls user profile information from multiple different data sources and allows individuals to uncover and take ownership of their information. The DSA system 100 allows individuals to lookup and correct their information if incorrect, thereby making the data more accurate and representative. This provides a significant check and balance for big businesses and other data entities that host and contain this information.

As a secondary benefit, source attribution provided by the DSA system 100, adds credibility to the data stored in local database 100. Individuals and other entities can verify that information displayed on webpage 160 is indeed indexed from a particular data source, adding an inherent third party verification. By nature, third party verification adds additional credibility to a data host such as DSA system 100, extinguishing suspicion that the data is falsely and arbitrarily generated by the data host.

Another benefit is that individuals can receive more targeted communications and better services from companies or entities, rather than receiving spam, incorrect services, or the equivalent. Inaccurate or incorrect information may result in the individual receiving communications regarding a particular topic they are not interested or addressed to a demographic that is not representative for that particular individual.

Data source attribution and the recognition of data sources in general may contribute to online reputation behavior and therefore data source attribution may also be an input into a reputation score algorithm as described in co-pending U.S. patent application Ser. No. 11/945,208 filed Nov. 26, 2007 entitled: Hierarchical, Traceable, and Association Reputation Assessment of Email Domains which is herein incorporated by reference in its entirety.

The reputation score system may take into account the fact that data source attribution provided for a particular person may garner a higher reputation and trustworthiness score, since it is more likely that the individual is an actual human being rather than a bot or equivalent. Also, the information doesn't have to be used as inputs for a reputation score or algorithm but may have other reputation and non-reputation uses that pertain to other internet data goals and missions.

The DSA system 100 can also evolve as more data on a person is found and analyzed. For example, the DSA system 100 can analyze and filter through the various different sources of data on a person, and efficiently build a single profile of that person that summarizes all of the information from the different data sources.

The embodiments and aspects described and illustrated above are meant to be exemplary and illustrative, not limiting in scope. In various embodiments, one or more of the above-described problems have been reduced or eliminated, while other embodiments are directed to other improvements. As used herein, the term "embodiment" means an embodiment that serves to illustrate by way of example but not limitation.

It will be appreciated to those skilled in the art that the preceding examples and embodiments are exemplary and not limiting to the scope of the disclosure. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

The invention claimed is:

1. A method for accumulating and displaying profile information, comprising:
   conducting a search of a plurality of websites for a plurality of types of profile information associated with a particular person;
   extracting any of the plurality of types of profile information comprising membership length of time information associated with the particular person identified on the plurality of websites;
   determining a length of time the particular person has been a member of each of the plurality of websites and identifying a more reliable website from the more than one of the plurality of websites by identifying which of such websites the particular person has been a member for the longest length of time;
   displaying, on a series of one or more web pages, only the profile information obtained from the more reliable of the websites from the plurality of websites; and
   identifying in the series of one or more web pages which of the plurality of websites provided which of the plurality of types of profile information displayed on the series of one or more web pages.

2. The method of claim 1 further comprising:
   displaying on the series of one or more web pages when the particular person last actively accessed the plurality of websites that supplied the plurality of types of profile information displayed on the series of one or more web pages.

3. The method according to claim 1 further comprising selectively preventing displaying selectable types of the profile information or identities of selectable websites from the plurality of websites that supplied the plurality of types of profile information.

4. A website including one or more processors, comprising:

an administration module configured to identify unique identifiers, wherein each unique identifier identifies a particular person;
a backend data indexer module configured to search for and extract a plurality of types of profile information comprising membership length of time information associated with the unique identifiers from a plurality of data sources;
a database system configured to accumulate and index the plurality of types of profile information extracted from the plurality of data sources; and
a user interface module configured to display together part or all of the plurality of types of accumulated profile information obtained from the plurality of data sources;
wherein the administration module is further configured to identify a length of time the particular person has been a member of each of the plurality of data sources and identifying a more reliable data source from the more than one of the plurality of data sources by identifying which of such data sources the particular person has been a member for a longest length of time; and
wherein the administration module is further configured to, where one of the plurality of types of profile information was obtained from more than one of the plurality of data sources, transmit only the profile information obtained from the more reliable data source from among the plurality of data sources.

5. The website of claim 4, wherein:
the indexer module is configured to include source identifiers with the plurality of types of information extracted that identify which of the plurality of data sources provided the plurality of types of information; and
the user interface module is configured to display the source identifiers together with the plurality of types of accumulated information on the user interface.

6. The apparatus according to claim 4 wherein at least some of the plurality of data sources are contained on a plurality of social websites and the indexer module is configured to automatically search the plurality of social websites to extract at least some of the plurality of types of profile information from personal profile data contained on the plurality of social websites.

7. The apparatus according to claim 6 wherein the indexer module is configured to extract at least some of the plurality of types of profile information from particular individuals associated with the unique identifiers.

8. The apparatus according to claim 4 wherein the administration module is configured to identify users who have accessed the plurality of types of profile information associated with the unique identifiers and display the users on the user interface.

* * * * *